(12) United States Patent
Li et al.

(10) Patent No.: US 12,444,774 B2
(45) Date of Patent: Oct. 14, 2025

(54) LITHIUM BATTERY PRODUCTION PROCESS AND EQUIPMENT

(71) Applicant: BEIJING WELION NEW ENERGY TECHNOLOGY CO., LTD, Beijing (CN)

(72) Inventors: Wenjun Li, Beijing (CN); Yunhao Liu, Beijing (CN); Baopeng Hou, Beijing (CN); Huigen Yu, Beijing (CN); Yongwei Li, Beijing (CN)

(73) Assignee: BEIJING WELION NEW ENERGY TECHNOLOGY CO., LTD, Beijing (CN)

( * ) Notice: Subject to any disclaimer, the term of this patent is extended or adjusted under 35 U.S.C. 154(b) by 783 days.

(21) Appl. No.: 17/788,963

(22) PCT Filed: Dec. 23, 2020

(86) PCT No.: PCT/CN2020/138599
§ 371 (c)(1),
(2) Date: Jun. 24, 2022

(87) PCT Pub. No.: WO2021/129659
PCT Pub. Date: Jul. 1, 2021

(65) Prior Publication Data
US 2023/0344012 A1    Oct. 26, 2023

(30) Foreign Application Priority Data
Dec. 27, 2019 (CN) .................. 201911380391.3

(51) Int. Cl.
*H01M 10/0587* (2010.01)
*H01M 10/04* (2006.01)
*H01M 10/052* (2010.01)

(52) U.S. Cl.
CPC ..... *H01M 10/0587* (2013.01); *H01M 10/052* (2013.01); *H01M 10/0409* (2013.01); *H01M 10/0431* (2013.01)

(58) Field of Classification Search
CPC ........... H01M 10/0587; H01M 10/052; H01M 10/0404; H01M 10/0409; H01M 10/0431; H01M 10/04
See application file for complete search history.

(56) References Cited

U.S. PATENT DOCUMENTS

2009/0280403 A1* 11/2009 Han .................. H01M 10/0431
429/163
2009/0325058 A1* 12/2009 Katayama ........... H01M 50/489
429/142

(Continued)

FOREIGN PATENT DOCUMENTS

CN    1874045    12/2006
CN   101682011    3/2010

(Continued)

OTHER PUBLICATIONS

International Search Report issued Mar. 24, 2021, in International (PCT) Application No. PCT/CN2020/138599, with English translation.

*Primary Examiner* — Nicholas A Smith
*Assistant Examiner* — Michael R. Worden
(74) *Attorney, Agent, or Firm* — Wenderoth, Lind & Ponack, L.L.P.

(57) ABSTRACT

Disclosed in the invention is a lithium battery production process, which comprises: through sequentially implemented processes of pre-compounding, winding for lamination, cutting, reclaiming material, continuously processing and assembling finished products, each electrode and separator are laminated, processed and formed, and finally assembled into a battery prefabricated product. The lithium (Continued)

battery production process is simple and efficient to implement, and it may realize continuous production of lithium battery products, thereby greatly improving battery production efficiency, and correspondingly simplifying the entire process flow to reduce the labor intensity of the staff. Also disclosed is a lithium battery production equipment for the above lithium battery production process.

12 Claims, 4 Drawing Sheets

(56) References Cited

U.S. PATENT DOCUMENTS

| | | | | |
|---|---|---|---|---|
| 2013/0101876 A1* | 4/2013 | Ueki | ............... | H01M 10/0431 429/94 |
| 2017/0207494 A1* | 7/2017 | Sasaki | ............... | H01M 10/0587 |
| 2017/0279156 A1* | 9/2017 | Botadra | ............ | H01M 10/0525 |
| 2019/0229312 A1* | 7/2019 | Brenner | ................ | H01M 50/24 |

FOREIGN PATENT DOCUMENTS

| | | | | |
|---|---|---|---|---|
| CN | 103219546 | | 7/2013 | |
| CN | 105742688 | | 7/2016 | |
| CN | 106505254 | | 3/2017 | |
| CN | 106784524 | | 5/2017 | |
| CN | 109301339 | | 2/2019 | |
| CN | 110492181 | | 11/2019 | |
| CN | 110649310 A | * | 1/2020 | ........ H01M 10/0587 |
| CN | 111082154 | | 4/2020 | |
| JP | 2009-295553 | | 12/2009 | |
| JP | 2013-179035 | | 9/2013 | |
| KR | 20060037828 A | * | 5/2006 | ........ H01M 10/0431 |
| KR | 10-2009-0101331 | | 9/2009 | |
| WO | 2008/109025 | | 9/2008 | |

* cited by examiner

LITHIUM BATTERY PRODUCTION PROCESS AND EQUIPMENT

This application claims the priority of the Chinese patent application filed on Dec. 27, 2019 with the application number 201911380391.3, titled "LITHIUM BATTERY PRODUCTION PROCESS AND EQUIPMENT", the entire contents of which are incorporated herein by reference.

TECHNICAL FIELD

The invention relates to the technical field of lithium battery production and processing, in particular to a lithium battery production process. The present invention also relates to a lithium battery production equipment for the above lithium battery production process.

BACKGROUND ART

In the current production and processing process of lithium batteries, as for a core of a lithium battery, a positive electrode, a separator, and a negative electrode are needed to be arranged in sequence, and its production methods are usually divided into two types: winding type and laminated type. Among them, the winding battery production process is to fix the central core and then wind the electrodes and the separator together to form a battery assembly; and this method is mostly used in the production and processing of cylindrical batteries, but this production process will lead to highly internal resistance of the core, and it is only suitable for the production of small-sized battery models. The production process of laminated batteries is to pre-cut the electrodes and separator into pieces according to the same specifications, then stack them from bottom to top and solder the electrode ears, finally the battery assembly is formed by packaging; this process method is commonly used in the production and processing of square batteries, but this method causes the overall process production efficiency to be low due to periodic pauses during the operation of the laminating mechanism.

Therefore, how to easily and efficiently realize the continuous production and processing of lithium batteries is an important technical problem that needs to be solved by those skilled in the art.

SUMMARY OF INVENTION

The purpose of the present invention is to provide a lithium battery production process, which can easily and efficiently realize the continuous production and processing of the lithium battery. Another object of the present invention is to provide a lithium battery production equipment for the above lithium battery production process.

In order to solve the above-mentioned technical problems, the present invention provides a lithium battery production process, comprising the steps of:

pre-compounding: a positive electrode, a separator, a negative electrode, and a separator are stacked neatly in any order, and then moderately rolled by a lead-in roller to compound into a battery strip, and the battery strip is continuously sent to a downstream prism through fixed axis rotation of the lead-in roller;

winding for lamination: through continuous fixed axis rotation of the prism, the battery strip is continuously winded and laminated on the outer peripheral surface of the prism, and the battery strip winded on the outer peripheral surface of the prism are pressed by a pressing assembly;

cutting: when the number of winding layers of the battery strip on any bearing surface of the prism meets the set number of winding layers for a product, the battery strip on the corresponding bearing surface that meets the number of winding layers for a product is precisely cut into a single battery assembly prefabricated product by a cutting assembly;

reclaiming material: the single battery assembly prefabricated product is made to continuously and synchronously rotate with the prism to a downstream reclaiming station, and then the single battery assembly prefabricated product is removed from the prism by a reclaiming device and placed into a downstream storage station or a downstream process equipment;

continuously processing: the above-mentioned cutting process and reclaiming process are repeated cyclically in sequence, and each of the single battery assembly prefabricated products that completely undergoes the above-mentioned process is removed one by one;

assembling a finished product: when the number of the single battery assembly prefabricated products generated by continuously processing meets product requirements, each of the single battery assembly prefabricated products are stacked neatly and then uniformly assembled into battery prefabricated products.

Preferably, in the pre-compounding process, the separator is a continuous long strip material, and the positive electrode and the negative electrode are continuous long strip materials or cut discontinuous electrode materials.

Preferably, in the pre-compounding process, if the positive electrode and the negative electrode are discontinuous electrode materials, a distance between adjacent two electrodes that have completed the pre-compounding process on the separator is positively correlated with the number of winded layers of the battery strip on the prism.

Preferably, in the winding for lamination process the tension of the battery strip between the lead-in roller and the prism is kept constant, and a variation range of the tension of the battery strip is not more than 50N.

The present invention also provides a lithium battery production equipment, which is used for the lithium battery production process as described in the above items, comprising: a frame in which a lead-in roller matched with the battery strip, a rotating shaft, and a main motor for driving the rotating shaft to rotate around a fixed axis are provided, wherein an outside of the rotating shaft is coaxially sleeved with a prism for linkage movement, an outer wall of the prism has a plurality of bearing surfaces arranged along its circumference and matched with the battery strip, and a pressing assembly for contacting and matching with the battery strip is provided on the bearing surface;

a support frame is telescopically connected between the bottom of the bearing surface and the rotating shaft, the bearing surface has a through hole that is aligned and matched with an extension end of the support frame, an outside of the bearing surface is provided with a pressing plate that is aligned and matched with the through hole, a telescopic cylinder is connected to a rear of the pressing plate, and a first spring is connected between an extension end of the telescopic cylinder and the pressing plate;

one side of the prism is provided with a reclaiming assembly, and the other side of the prism is provided with a cutting assembly, wherein the lead-in roller, the cutting assembly, the pressing plate, and the reclaiming assembly are arranged sequentially from upstream to downstream along a conveying direction of the battery strip.

Preferably, the prism is a regular polygonal prism.

Preferably, the rotating shaft is a regular polygonal prism, each side surface of the rotating shaft is in one-to-one correspondence with each of the bearing surfaces and matched in parallel, and the support frame is located between each side surface of the rotating shaft and the bearing surface aligned and matched with the side surface.

Preferably, the pressing assembly comprises a base fixed on the bearing surface, an upper part of the base is provided with a connecting rod in a direction parallel to the axis of the prism, one end of the connecting rod close to the middle of the prism is provided with a pressing handle for contacting and matching with the battery strip, a first swing rod and a second swing rod arranged in sequence along an axial direction of the prism are respectively provided between the connecting rod and the base, the adjacent ends among the base, the first swing rod, the connecting rod and the second swing rod are hinged in sequence to form a four-bar linkage mechanism, an extension direction of each of hinge shafts is parallel to the bearing surface where the base is located and perpendicular to the axis of the prism, and the base is also provided with a pressing motor for driving a linkage movement of the four-bar linkage mechanism.

Preferably, a guide post penetrates through an end of the connecting rod along a direction perpendicular to the bearing surface where the base is located, the pressing handle is connected to the bottom of the guide post, and the guide post is sleeved with a second spring embedded between the bottom surface of the end of the connecting rod and the top surface of the pressing handle, and the bottom of the pressing handle is provided with a flexible gasket for contacting and matching with the battery strip.

Preferably, the cutting assembly comprises a cutting head and a first position control system, the cutting head is any one of a laser cutting head, a knife with a cutting edge, or a high-temperature knife with a heating function, and the first position control system is a slider moving mechanism consisting of a slider controllably moving on a guide rail or a multi-axis mechanical arm.

Preferably, the reclaiming assembly comprises a gripping head and a second position control system, the gripping head is a clamping plate driven by a finger driving member, and the second position control system is a slider moving mechanism consisting of a slider controllably moving on a guide rail or a multi-axis mechanical arm.

Preferably, the finger driving member is a finger air cylinder or a finger motor.

Compared with the above-mentioned background technology, in the lithium battery production process provided by the present invention, through sequentially implemented processes of pre-compounding, winding for lamination, cutting, reclaiming material, continuously processing and assembling finished product, each electrode and separator are laminated, processed and formed, and finally assembled into a battery prefabricated product. The lithium battery production process is simple and efficient to implement, and it may realize continuous production of lithium battery products, thereby greatly improving the battery production efficiency, and correspondingly simplifying the entire process flow to reduce the labor intensity of the staff.

In addition, as for the lithium battery production equipment provided by the present invention, during the operation process, a positive electrode, a separator, a negative electrode and another separator are aligned and laminated in sequence to be placed at the lead-in roller, under the guidance of the fixed axis rotation of the lead-in roller, each of the electrodes and separator are laminated to form a battery strip assembly to be continuously transported to a prism, and are continuously winded and laminated in sequence on the outer peripheral surface of the prism under the action of the fixed axis rotation of the prism. During the winding and laminating process, when any bearing surface of the prism is about to run to the input station of the battery strip, the corresponding pressing assembly on the bearing surface is released and lifted, so that when running to the input station of the battery strip, the battery strip can be smoothly and accurately aligned and winded on the bearing surface. When the bearing surface passes through the input station of the battery strip and the battery strip on the bearing surface is aligned and winded in place, the corresponding pressing assembly falls down again to press the battery strip moderately to ensure the strength of the lamination and compression structure of each component in the battery strip assembly. After that, the bearing surface continues to move, and the adjacent bearing surface located downstream of the bearing surface moves in sequence to the input station of the battery strip and then the battery strip is aligned and winded thereon, the entire prism is rotated cyclically around a fixed axis and the battery strip is continuously winded and laminated on its outer peripheral surface until the number and the structure of battery strip assemblies laminated on any bearing surface of the prism satisfies the set number of winding layers, and then the bearing surface continues to rotate with the prism to a station corresponding to the cutting assembly, and the cutting assembly cuts the battery strip assembly on the bearing surface to form a single cell assembly prefabricated product. After continuing to rotate at an appropriate angle the prism stops rotating, the telescopic cylinder extends and drives the pressing plate to move until the front end surface of the pressing plate is in full contact with the single battery assembly prefabricated product that has been cut and formed. At this time, the corresponding pressing assembly is released and lifted to disengage from the single battery assembly prefabricated product, and at the same time the support frame protrudes from the through hole, so that the single battery assembly prefabricated product that has been cut and formed is lifted and separated from the bearing surface, and then the support frame continues to extend and drives the single battery assembly prefabricated product to gradually move away from the outer peripheral surface of the prism. During this process, the first spring is continuously pressed. After that, the battery assembly prefabricated product clamped between the pressing plate and the support frame is clamped reliably by the reclaiming assembly, and then the support frame and the telescopic cylinder are gradually retracted, and the first spring is gradually extended to reset until the pressing plate and the support frame are disengaged from the single battery assembly prefabricated product, after that, the single battery assembly prefabricated product can be smoothly removed by the reclaiming assembly to put into the downstream storage station, so as to complete the production and processing of the single battery assembly prefabricated product; after the cutting process of the single battery assembly prefabricated product is completed, the corresponding battery strip on the adjacent bearing surface continues to rotate in linkage with the prism at a certain angle to the cutting assembly station, then stops rotating and performs cutting, and then it only needs to repeat the forming and reclaiming process of the previous single battery assembly prefabricated product in sequence, after the reclaiming is completed, each of the single battery assembly prefabricated products are stacked in sequence to the storage station until its number meets the assembly requirements, and then the multiple single battery assembly prefabricated products can be uniformly assembled to form a complete battery prefabricated product. The operation process of the above-mentioned lithium battery production equipment is stable and efficient, and the continuous operation of the equipment and the continuous production of battery assemblies can be realized through the coordination of various components, which significantly improves the production and processing efficiency of lithium batteries, thereby greatly reducing the manual operations required in the lithium battery production process and reducing the labor intensity of workers.

BRIEF DESCRIPTION OF THE DRAWINGS

In order to explain the embodiments of the present invention or the technical solutions in the prior art more clearly, the accompanying drawings to be used in the description of the embodiments or the prior art will be briefly introduced below. Obviously, the accompanying drawings illustrated in the following description are only some embodiments of the present invention. For those of ordinary skill in the art, other drawings can also be obtained according to these drawings without creative efforts.

Particularly, 10—frame, 101—lead-in roller, 102—first lead-in roller, 103—second lead-in roller, 104—rotating shaft, 105—main motor, 11—prism, 111—bearing surface, 112—support frame, 113—through hole, 114—pressing plate, 115—telescopic cylinder, 116—first spring, 121—base, 122—connecting rod, 123—pressing handle, 124—first swing rod, 125—second swing rod, 126—pressing motor, 127—guide post, 128—second spring, 129—flexible gasket, 131—first main guide rail, 132—first slider, 133—cutting head, 134—first auxiliary guide rail, 141—second main guide rail, 142—second slider, 143—clamping plate, 144—finger driving member, 145—second auxiliary guide rail, 20—battery strip, 21—positive electrode, 22—negative electrode, 23—separator.

DETAILED DESCRIPTION OF THE INVENTION

The object of the present invention is to provide a lithium battery production process, which can easily and efficiently realize the continuous production and processing of lithium batteries; in addition, it also provides a lithium battery production equipment for the above lithium battery production process.

In order to make those skilled in the art better understand the solutions of the present invention, the present invention will be further described in detail below with reference to the accompanying drawings and particular embodiments.

Figure 1:
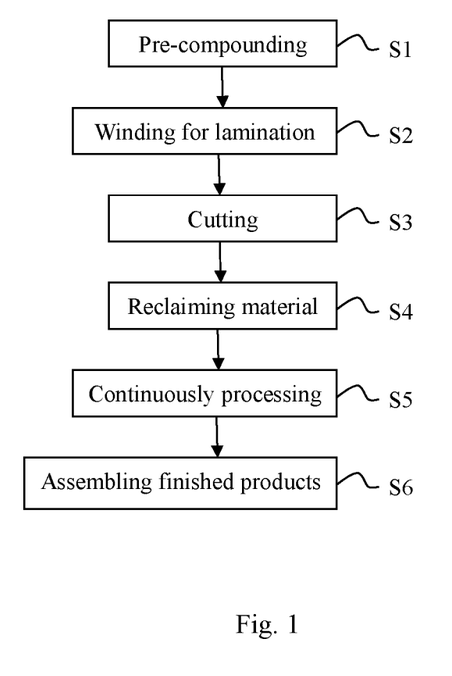
FIG. 1 is a flow chart of the lithium battery production process provided by a particular embodiment of the present invention.

Please refer to FIG. 1, a flowchart of the lithium battery production process provided by a particular embodiment of the present invention.

In a particular embodiment, the lithium battery production process provided by the present invention comprises:

Step S1: pre-compounding;
a positive electrode 21, a separator 23, a negative electrode 22, and another separator 23 are stacked neatly from top to bottom in order, and then moderately rolled by a lead-in roller 101 to compound a battery strip 20, and the battery strip 20 is continuously sent to a downstream prism 11 through fixed axis rotation of the lead-in roller 101.

Step S2: winding for lamination;
through continuous fixed axis rotation of the prism 11, the battery strip 20 is continuously winded and laminated on the outer peripheral surface of the prism 11, and the battery strip 20 winded on the outer peripheral surface of the prism 11 are pressed by the pressing assembly.

Step S3: cutting;
when the number of winding layers of the battery strip 20 on any bearing surface 111 of the prism 11 meets the set number of winding layers for a product, the battery strip 20 on the corresponding bearing surface 111 that meets the number of winding layers for a product is precisely cut into a single battery assembly prefabricated product by a cutting assembly.

Step S4: reclaiming material;
the single battery assembly prefabricated product is made to continuously and synchronously rotate with the prism 11 to a downstream reclaiming station, and then the single battery assembly prefabricated product is removed from the prism 11 by a reclaiming device and placed into a downstream storage station.

Step S5: continuously processing;
the above-mentioned cutting process and reclaiming process are repeated cyclically in sequence, and each of the removed single battery assembly prefabricated products are stacked one by one at the storage station.

Step S6: assembling a finished product;
when the number of the single battery assembly prefabricated products stacked at the storage station meets product requirements, each of the single battery assembly prefabricated products are stacked neatly and then assembled into battery prefabricated products uniformly.

Figure 2:
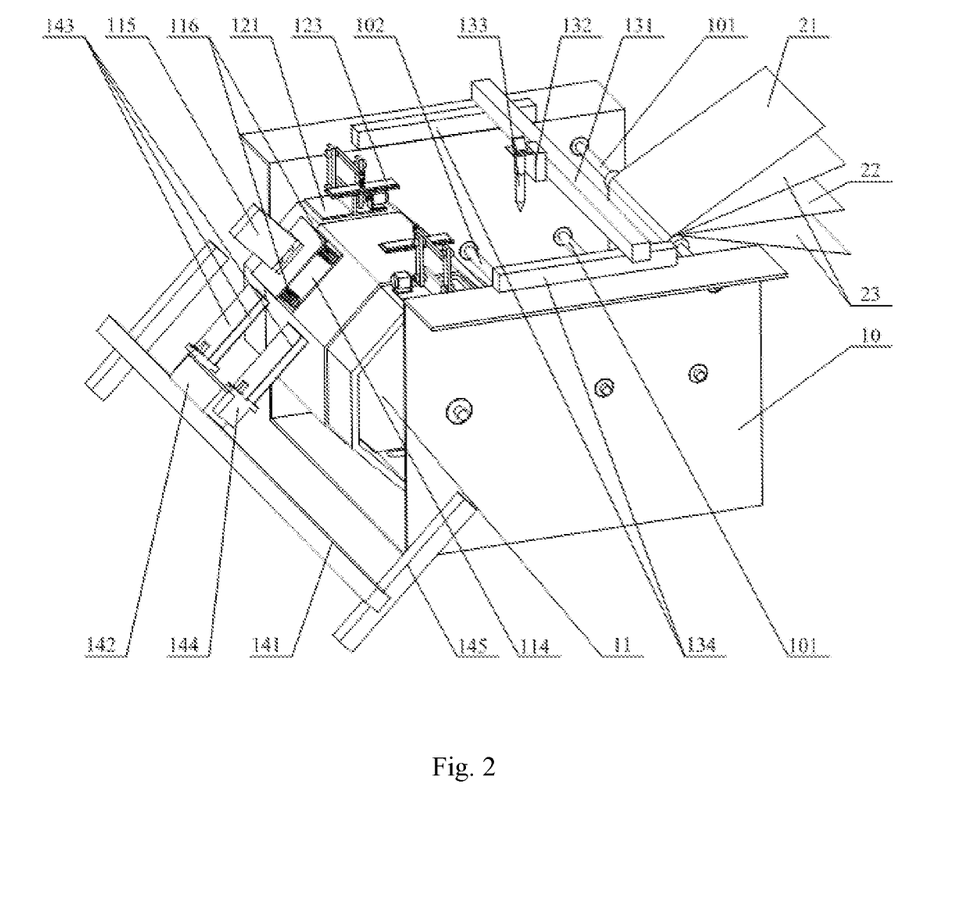
FIG. 2 is a schematic diagram of the external structure of the lithium battery production equipment provided by a particular embodiment of the present invention.
Figure 3:
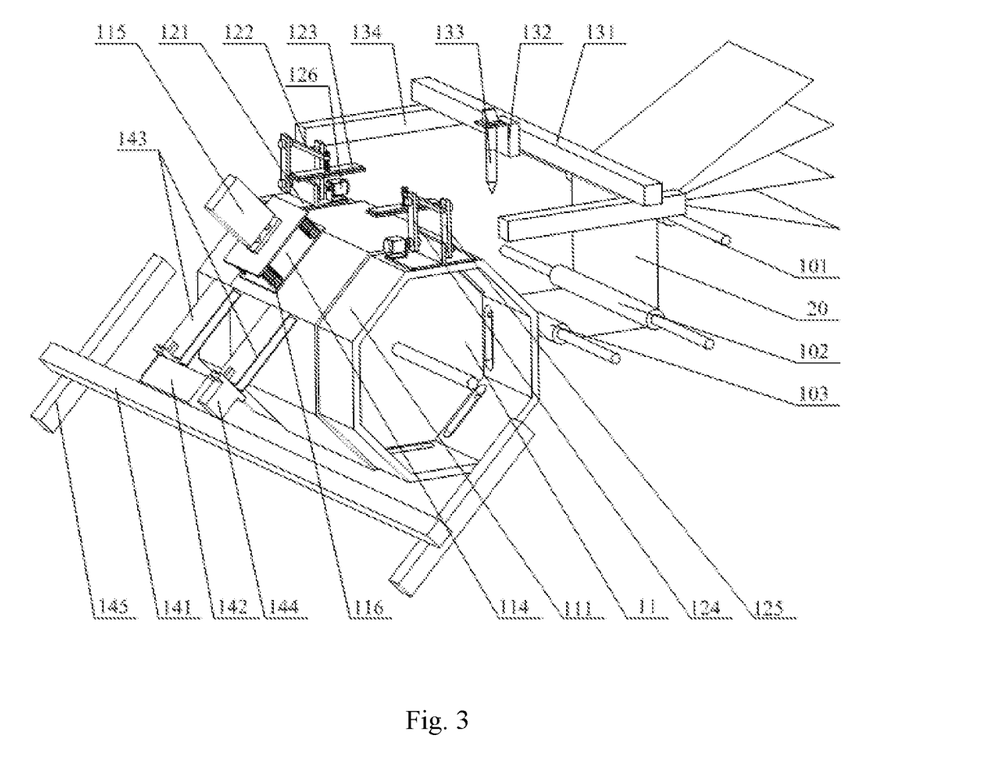
FIG. 3 is a schematic diagram of the matching structure of each assembly inside the housing in FIG. 2.
Figure 4:
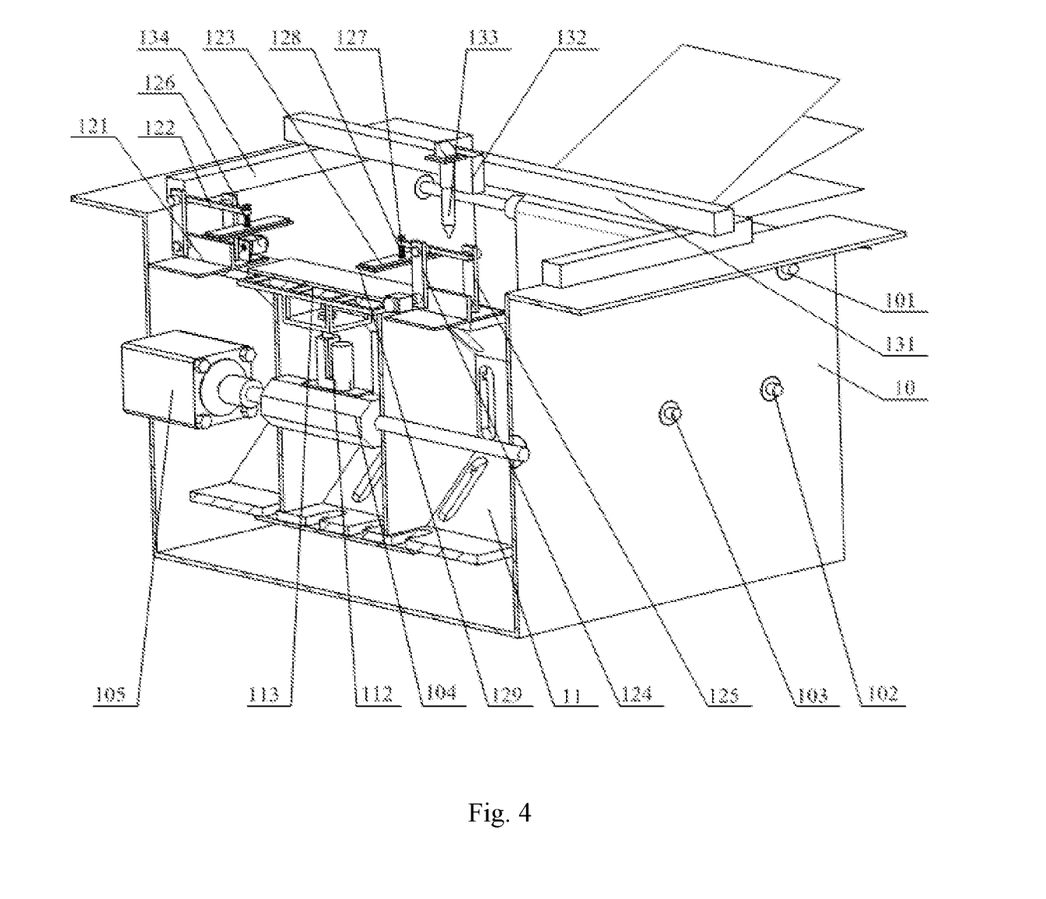
FIG. 4 is a cross-sectional view of the middle part structure of FIG. 2.

Please refer to FIGS. 2-4. FIG. 2 is a schematic diagram of the external structure of the lithium battery production equipment provided by a particular embodiment of the present invention; FIG. 3 is a schematic diagram of the matching structure of each assembly inside the housing in FIG. 2; FIG. 4 is a cross-sectional view of the middle part structure of FIG. 2.

In a particular embodiment, the lithium battery production equipment provided by the present invention, which is used for the above-mentioned lithium battery production process, comprises: a frame 10 in which a lead-in roller 101 matched with the battery strip 20, a rotating shaft 104, and a main motor 105 for driving the rotating shaft 104 to rotate around a fixed axis are provided, wherein an outside of the rotating shaft 104 is coaxially sleeved with a prism 11 for linkage movement, an outer wall of the prism 11 has a plurality of bearing surfaces 111 arranged along its circumference and matched with the battery strip 20, and a pressing assembly for contacting and matching with the battery strip 20 is provided on the bearing surface 111; a support frame 112 is telescopically connected between the bottom of the bearing surface 111 and the rotating shaft 104, the bearing surface 111 has a through hole 113 that is aligned and matched with an extension end of the support frame 112, an outside of the bearing surface 111 is provided with a pressing plate 114 that is aligned and matched with the through hole 113, a telescopic cylinder 115 is connected to a rear of the pressing plate 114, and a first spring 116 is connected between an extension end of the telescopic cylinder 115 and the pressing plate 114; one side of the prism 111 is provided with a reclaiming assembly, and the other side of the prism 111 is provided with a cutting assembly, wherein the cutting assembly, the pressing plate 114, and the reclaiming assembly are arranged sequentially from upstream to downstream along a material conveying direction of prism 11.

During the operation of the equipment, a positive electrode 21, a separator 23, a negative electrode 22 and another separator 23 are aligned and laminated in sequence to be placed at the lead-in roller 101, under the guidance of the fixed axis rotation of the lead-in roller 101, each of the electrodes and separator 23 are laminated to form a battery strip 20 assembly to be continuously transported to a prism 11, and are continuously winded and laminated in sequence on the outer peripheral surface of the prism 11 under the action of the fixed axis rotation of the prism 11. During the winding and laminating process, when any bearing surface 111 of the prism 11 is about to run to the input station of the battery strip 20, the corresponding pressing assembly on the bearing surface 111 is released and lifted, so that when running to the input station of the battery strip 20, the battery strip 20 can be smoothly and accurately aligned and winded on the bearing surface 111. When the bearing surface 111 passes through the input station of the battery strip 20 and the battery strip 20 on the bearing surface 111 is aligned and winded in place, the corresponding pressing assembly falls down again to press the battery strip 20 moderately to ensure the strength of the lamination and compression structure of each component in the battery strip 20 assembly. After that, the bearing surface 111 continues to move, and the adjacent bearing surface 111 located downstream of the bearing surface 111 moves in sequence to the input station of the battery strip 20, and then the battery strip 20 is aligned and winded thereon, the entire prism 11 is rotated cyclically around a fixed axis and the battery strip 20 is continuously winded and laminated on its outer peripheral surface until the number and the structure of battery strip 20 assemblies laminated on any bearing surface 111 of the prism 11 satisfies the set number of winding layers, and then the bearing surface 111 continues to rotate with the prism 11 to a station corresponding to the cutting assembly, and the cutting assembly cuts the battery strip 20 assembly on the bearing surface 111 to form a single cell assembly prefabricated product. After continuing to rotate at an appropriate angle the prism 11 stops rotating, the telescopic cylinder 115 extends and drives the pressing plate 114 to move until the front end surface of the pressing plate 114 is in full contact with the single battery assembly prefabricated product that has been cut and formed. At this time, the pressing assembly is released and lifted to disengage from the single battery assembly prefabricated product, and at the same time the support frame 112 protrudes from the through hole 113, so that the single battery assembly prefabricated product that has been cut and formed is lifted and separated from the bearing surface 111, and then the support frame 112 continues to extend and drives the single battery assembly prefabricated product to gradually move away from the outer peripheral surface of the prism 11. During this process, the first spring 116 is continuously pressed. After that, the battery assembly prefabricated product clamped between the pressing plate 114 and the support frame 112 is clamped reliably by the reclaiming assembly, and then the support frame 112 and the telescopic cylinder 115 are gradually retracted, and the first spring 116 is gradually extended to reset until the pressing plate 114 and the support frame 112 are disengaged from the single battery assembly prefabricated product, after that, the single battery assembly prefabricated product can be smoothly removed by the reclaiming assembly to put into the downstream storage station, so as to complete the production and processing of the single battery assembly prefabricated product; after the cutting process of the single battery assembly prefabricated product is completed, the corresponding battery strip 20 on the adjacent bearing surface 111 continues to rotate in linkage with a prism 11 to the cutting assembly station, and performs cutting, and then it only needs to repeat the forming and reclaiming process of the previous single battery assembly prefabricated product in sequence, after the reclaiming is completed, each of the single battery assembly prefabricated products are stacked in sequence to the storage station until its number meets the equipping requirements, and then the multiple single battery assembly prefabricated products can be uniformly assembled to form a complete battery prefabricated product. The operation process of the above-mentioned lithium battery production equipment is stable and efficient, and the continuous operation of the equipment and the continuous production of battery assemblies can be realized through the coordination of various components, which significantly improves the production and processing efficiency of lithium batteries, thereby greatly reducing the manual operations required in the lithium battery production process and reducing the labor intensity of workers.

Further, the prism 11 is a regular polygonal prism 11. In practical applications, the number of the side surfaces of the prism 11 (i.e., the bearing surfaces 111 described in the text) is at least three. Considering the stability of actual equipment operation, the processing efficiency of single-cycle operation, and the costs of equipment manufacturing and use, preferably the number of the side surfaces of the prism 11 are 8; in addition, during the operation of the equipment, the battery strip 20 on each of bearing surfaces 111 in the same round of winding state advances to the next station one by one according to the sequence of the process positions, after the most last one piece of the battery strip 20 with the same number of laminated layers currently being winded has completed the initial process of winding the last layer, the most front one piece of the battery strip 20 to be winded in the next round is then advanced to the initial process, and in the subsequent winding process, it always follows the most last one piece of the battery strip 20 winded in the previous round to gradually completes each process in sequence, at the same time, subsequent sections of winding battery strip 20 in the next round also advance one by one following the most front one piece to each process to complete the winding and the corresponding process steps, thereby realizing the seamless processing of battery strips 20 between different batches and rounds, avoiding no-load of the equipment, and improving the overall processing efficiency and process effect.

For example, as each part of the battery strip 20 on the prism 11 in the first round is cut and removed one by one, each bearing surface 111 disengaged from the match with the battery strip 20 in first round receives the second round of battery strip 20 in sequence, and the battery strip 20 is aligned and winded in sequence, so as to complete the smooth connection between the first round of winding and the second round of winding, and the subsequent rounds of winding can be implemented according to the sequence of this process to realize the continuous implementation of the entire process.

It should be noted that, the number of the side surfaces of the above prism 11 is only an example to illustrate a preferred embodiment. In practical applications, the staff may flexibly select the number of side surfaces of the prism 11 according to the specific working conditions, in principle, as long as it meets the requirements for actual application of the lithium battery production equipment.

In addition, the rotating shaft 104 is a regular polygonal prism 11, and each side surface of the rotating shaft 104 corresponds to each bearing surface 111 one-to-one and fits in parallel, and the support frame 112 is located between any side surface of the rotating shaft 104 and the bearing surfaces 111 aligned and matched with the side surface. The rotating shaft 104 is also set as a regular polygonal prism 11 structure that is coaxially aligned with the prism 11, which helps to further optimize the stability of linkage rotation the rotating shaft 104 and the prism 11, and at the same time, it is ensured that the structural support provided by the rotating shaft 104 to the support frame 112 is more stable and reliable, and the corresponding stress distribution is more uniform.

Particularly, the pressing assembly comprises a base 121 fixed on the bearing surface 111, wherein a connecting rod 122 is provided above the base 121 along a direction parallel to the axis of the prism 11, and one end of the connecting rod 122 close to the middle part of the prism 11 is provided with a pressing handle 123 for contacting and matching with the battery strip 20, a first swing rod 124 and a second swing rod 125 arranged in sequence along the axial direction of the prism 11 are respectively provided between the connecting rod 122 and the base 121. The adjacent ends among the base 121, the first swing rod 124, the connecting rod 122 and the second swing rod 125 are hinged in sequence to form a four-bar linkage mechanism 122, and an extension direction of each of hinge shafts is parallel to the bearing surface 111 where the base 121 is located and perpendicular to the axis of the prism 11, and the base 121 is also provided with a pressing motor 126 for driving a linkage movement of the four-bar linkage mechanism 122. In actual operation, when pressing is required, the pressing motor 126 drives the linkage movement of the four-bar linkage mechanism to mobilize the pressing handle 123 to press down until it fully contacts and presses the battery strip 20 on the corresponding bearing surface 111; when it is necessary to release the pressing, the pressing motor 126 drives the linkage movement of the four-bar linkage mechanism 122 to mobilize the pressing handle 123 to lift up and disengage from the battery strip 20.

It should be pointed out that, the above-mentioned pressing motor 126 can also be replaced by other driving devices with pressing ability, and the staff can choose flexibly according to the actual working conditions, in principle, as long as the requirements of the lithium battery production equipment and its corresponding production process can be met.

It should be further explained that, in practical applications, considering the linkage movement effect of the assembly structure and the actual operation efficiency, the effective length of the first swing rod 124 is set to be L1, and the effective length of the second swing rod 125 is L2, then $0.5 \leq L1/L2 \leq 2$, wherein the above-mentioned effective length refers to the axial length of the rod body part between the hinge points at both ends of the rod body.

More particularly, a guide post 127 penetrates through the end of the connecting rod 122 along a direction perpendicular to the bearing surface 111 where the base 121 is located, the pressing handle 123 is connected to the bottom of the guide post 127, and the guide post 127 is sleeved with a second spring 128 embedded between the bottom surface of the end of the connecting rod 122 and the top surface of the pressing handle 123. The bottom of the pressing handle 123 is provided with a flexible gasket 129 for contacting and matching with the battery strip 20. The guide post 127 can provide a reliable limited-position guidance for the up and down reciprocating movement of the pressing handle 123, in order to avoid dislocation or loosening during the up and down reciprocating movement of the pressing handle 123, thereby ensuring the alignment accuracy and stress distribution effect between the pressing handle 123 and the battery strip 20; at the same time, the flexible gasket 129 can effectively relieve the structural impact when the pressing handle 123 is in contact with the battery strip 20, thereby protecting the structural integrity of the battery strip 20 assemblies.

It should be pointed out that, the above-mentioned flexible gasket 129 can be made of soft materials such as plastic pads, silicone pads or sponge pads in specific applications. In principle, the staff can flexibly select the material of the flexible gasket 129 according to the working conditions, as long as it can meet the requirements of the contact and cooperate between the pressing handle 123 and the battery strip 20.

On the other hand, the cutting assembly comprises a cutting head 133 and a first position control system, the first position control system is provided with a first main guide rail 131 along a direction parallel to the axis of the prism 11, a first slider 132 is movably provided on the first main guide rail 131, and a cutting head 133 is provided on the first slider 132 to cooperate with the battery strip 20; the frame 10 is provided with first auxiliary guide rails 134 which are respectively aligned with the two ends of the first main guide rail 131 along the extending direction perpendicular to the first main guide rail 131, and the first main guide rail 131 is slidably provided on the first auxiliary guide rail 134. When the laminated battery strip 20 assembly needs to be cut, the first slider 132 and the cutting head 133 can be quickly and accurately move to the corresponding cutting position through the secondary plane biaxial moving mechanism formed by the first main guide rail 131 and the second main guide rail 141, in order to cut and ensure the corresponding cutting accuracy and the effect of the battery assembly product after cutting. After a single cut is completed, the slider and the cutting head 133 can be moved to an appropriate position by the above-mentioned secondary plane biaxial moving mechanism, so as to avoid structural interference or adverse effects on the operation process of the main moving parts such as the prism 11, thereby ensuring the overall operation efficiency and stability of the equipment.

In addition, the cutting head 133 is any of a laser cutting head 133, a hard blade, a thermal cutting head 133, an ultrasonic cutting head 133, a pneumatic cutting head 133, or a hydraulic cutting head 133. Considering the actual process effect and operation efficiency, preferably the cutting head 133 is a laser cutting head 133. Of course, the type of the cutting head 133 is not limited to the above, and in practical applications, the staff can flexibly selected the type of the cutting head 133 according to the needs of the working conditions, in principle, as long as the cutting efficiency of the battery strip 20 and the quality of the battery assembly prefabricated product after cutting can be guaranteed.

In addition, the reclaiming assembly comprises a gripping head and a second position control system, wherein the second position control system comprises a second main guide rail 141 arranged along a direction parallel to the axis of the prism 11, and the second main guide rail 141 is movably provided with the second slider 142; particularly, the gripping head is two clamping plates 143 provided on the second slider 142, and the second slider 142 is also provided with a finger driving member 144 that can drive the two clamping plates 143 to be detachable and interlocking, the frame 10 is provided with second auxiliary guide rails 145 which are respectively aligned with the two ends of the second main guide rail 141 along the extending direction perpendicular to the second main guide rail 141. The second main guide rail 141 is slidably provided on the second auxiliary guide rail 145. The secondary plane biaxial moving mechanism formed by the cooperation of the second main guide rail 141 and the second auxiliary guide rail 145 can quickly and accurately move the second slider 142, the finger driving member 144 and the corresponding clamping plate 143 to a position corresponding to the single battery assembly prefabricated product, so that when the prism 11 drives the single battery assembly prefabricated product clamped by the pressing plate 114 and the support frame 112 to move to the reclaiming station after being cut, the single battery assembly prefabricated product can be accurately clamped and removed from the previous station by driving the opening and closing of the clamping plates 143 by the finger driving member 144, then accurately transporting it to the downstream storage station. After the operation is completed, the second slider 142, the finger driving member 144 and the corresponding clamping plates 143 is quickly moved to an appropriate position by the cooperation between the first main guide rail 131 and the second main guide rails 141, so as to avoid structural interference with the main moving parts such as the prism 11, thereby ensuring the overall operating efficiency and stability of the equipment.

Of course, the structural forms of the above-mentioned first position control system and the second position control system are only for illustrative purposes. In practical applications, the specific matching structures of the above-mentioned position control systems are not limited to these, particularly, its structure can also be a multi-axis manipulator, etc., and the staff can flexibly choose the structure of each position control system according to the requirements of actual working conditions and equipment assembly and use.

Further, the finger driving member 144 is a finger air cylinder or a finger motor. Of course, the specific structure and driving form of the finger driving member 144 can be flexibly selected according to the actual working conditions, in principle, as long as the operation efficiency and clamping accuracy of the clamping plate 143 can be ensured.

In addition, a first lead-in roller 102 and a second lead-in roller 103 are sequentially provided in parallel between the lead-in roller 101 and the prism 11 along the conveying direction of the battery strip 20. The first lead-in roller 102 cooperates with the second lead-in roller 103 to accurately guide and moderately press the battery strip 20 before the battery strip 20 enters the prism 11 station, so as to avoid misalignment or wrinkling of the laminates such as the separators 23 the electrodes, thereby ensuring the subsequent winding and lamination effect of the battery strip 20 and the quality of the final battery assembly prefabricated product.

From the above, as for the lithium battery production equipment provided by the present invention, during the operation process, a positive electrode, a separator, a negative electrode and another separator are aligned and laminated in sequence to be placed at the lead-in roller, under the guidance of the fixed axis rotation of the lead-in roller, each of the electrodes and separator are laminated to form a battery strip assembly to be continuously transported to a prism, and are continuously winded and laminated in sequence on the outer peripheral surface of the prism under the action of the fixed axis rotation of the prism. During the winding and laminating process, when any bearing surface of the prism is about to run to the input station of the battery strip, the corresponding pressing assembly on the bearing surface is released and lifted, so that when running to the input station of the battery strip, the battery strip can be smoothly and accurately aligned and winded on the bearing surface. When the bearing surface passes through the input station of the battery strip and the battery strip on the bearing surface is aligned and winded in place, the corresponding pressing assembly falls down again to press the battery strip moderately to ensure the strength of the lamination and compression structure of each component in the battery strip assembly. After that, the bearing surface continues to move, and the adjacent bearing surface located downstream of the bearing surface moves in sequence to the input station of the battery strip and then the battery strip is aligned and winded thereon, the entire prism is rotated cyclically around a fixed axis and the battery strip is continuously winded and laminated on its outer peripheral surface until the number and the structure of battery strip assemblies laminated on any bearing surface of the prism satisfies the set number of winding layers, and then the bearing surface continues to rotate with the prism to a station corresponding to the cutting assembly, and the cutting assembly cuts the battery strip assembly on the bearing surface to form a single cell assembly prefabricated product. After continuing to rotate at an appropriate angle the prism stops rotating, at this time, the telescopic cylinder extends and drives the pressing plate to move until the front end surface of the pressing plate is in full contact with the single battery assembly prefabricated product that has been cut and formed. At this time, the pressing assembly is released and lifted to disengage from the single battery assembly prefabricated product, and at the same time the support frame protrudes from the through hole, so that the single battery assembly prefabricated product that has been cut and formed is lifted and separated from the bearing surface, and then the support frame continues to extend and drives the single battery assembly prefabricated product to gradually move away from the outer peripheral surface of the prism. During this process, the first spring is continuously pressed. After that, the battery assembly prefabricated product clamped between the pressing plate and the support frame is clamped reliably by the reclaiming assembly, and then the support frame and the telescopic cylinder are gradually retracted, and the first spring is gradually extended to reset until the pressing plate and the support frame are disengaged from the single battery assembly prefabricated product, after that, the single battery assembly prefabricated product can be smoothly removed by the reclaiming assembly to put into the downstream storage station, so as to complete the production and processing of the single battery assembly prefabricated product; after the cutting process of the above single battery assembly prefabricated product is completed, the corresponding battery strip on the adjacent bearing surface continues to rotate in linkage with the prism to the cutting assembly station, and then it only needs to repeat the forming and reclaiming process of the previous single battery assembly prefabricated product in sequence, after the reclaiming is completed, each of the single battery assembly prefabricated products in sequence to the storage station until its number meets the assembly requirements, and then the multiple single battery assembly prefabricated products can be uniformly assembled to form a complete battery prefabricated product. The operation process of the above-mentioned lithium battery production equipment is stable and efficient, and the continuous operation of the equipment and the continuous production of battery assemblies can be realized through the coordination of various components, which significantly improves the production and processing efficiency of lithium batteries, thereby greatly reducing the manual operations required in the lithium battery production process and reducing the labor intensity of workers.

The lithium battery production process provided by the present invention and the lithium battery production equipment used for the lithium battery production process are described above in detail. The principles and implementations of the present invention are described herein by using particular examples, and the descriptions of the above embodiments are only used to help understand the method and the spirit of the present invention. It should be pointed out that for those skilled in the art, without departing from the principle of the present invention, several improvements and modifications can also be made to the present invention, and these improvements and modifications also fall within the protection scope of the claims of the present invention.

The invention claimed is:

1. A lithium battery production process, comprising the steps of:
    pre-compounding: a positive electrode, a separator, a negative electrode, and another separator are stacked neatly in any order, and then moderately rolled by a lead-in roller to compound into a battery strip, and the battery strip is continuously sent to a downstream prism through fixed axis rotation of the lead-in roller;
    winding for lamination: through continuous fixed axis rotation of the prism, the battery strip is continuously wound and laminated on the outer peripheral surface of the prism, and the battery strip wound on the outer peripheral surface of the prism are pressed by a pressing assembly;
    cutting: when the number of winding layers of the battery strip on any bearing surface of the prism meets the set number of winding layers for a product, the battery strip on the corresponding bearing surface that meets the number of winding layers for a product is precisely cut into a single battery assembly prefabricated product by a cutting assembly;
    reclaiming material: the single battery assembly prefabricated product is made to continuously and synchronously rotate with the prism to a downstream reclaiming station, and then the single battery assembly prefabricated product is removed from the prism by a reclaiming assembly and placed into a downstream storage station or a downstream process equipment;
    continuously processing: the above-mentioned cutting process and reclaiming process are repeated cyclically in sequence, and each of the single battery assembly prefabricated products that completely undergoes the above-mentioned process is removed one by one; and assembling a finished product: when the number of the single battery assembly prefabricated products generated by continuously processing meets product requirements, each of the single battery assembly prefabricated products are stacked neatly and then uniformly assembled into battery prefabricated products.

2. The lithium battery production process according to claim 1, wherein in the pre-compounding process, the separator is a continuous long strip material, and the positive electrode and the negative electrode are continuous long strip materials or cut discontinuous electrode materials.

3. The lithium battery production process according to claim 2, wherein in the pre-compounding process, if the positive electrode and the negative electrode are discontinuous electrode materials, a distance between adjacent two electrodes that have completed the pre-compounding process on the separator is positively correlated with the number of wound layers of the battery strip on the prism.

4. The lithium battery production process according to claim 1, wherein in the winding for lamination process the tension of the battery strip between the lead-in roller and the prism is kept constant, and a variation range of the tension of the battery strip is not more than 50N.

5. A lithium battery production equipment for use in the lithium battery production process according to claim 1, comprising: a frame in which the lead-in roller matched with the battery strip, a rotating shaft, and a main motor for driving the rotating shaft to rotate around a fixed axis are provided, wherein an outside of the rotating shaft is coaxially sleeved with the prism for linkage movement, an outer wall of the prism has a plurality of bearing surfaces arranged along its circumference and matched with the battery strip, and the pressing assembly for contacting and matching with the battery strip is provided on the bearing surface; a support frame is telescopically connected between the bottom of the bearing surface and the rotating shaft, the bearing surface has a through hole that is aligned and matched with an extension end of the support frame, an outside of the bearing surface is provided with a pressing plate that is aligned and matched with the through hole, a telescopic cylinder is connected to a rear of the pressing plate, and a first spring is connected between an extension end of the telescopic cylinder and the pressing plate; one side of the prism is provided with the reclaiming assembly, and the other side of the prism is provided with the cutting assembly, wherein the lead-in roller, the cutting assembly, the pressing plate, and the reclaiming assembly are arranged sequentially from upstream to downstream along a conveying direction of the battery strip.

6. The lithium battery production equipment according to claim 5, wherein the prism is a regular polygonal prism.

7. The lithium battery production equipment according to claim 6, wherein the rotating shaft is a regular polygonal prism, each side surface of the rotating shaft is in one-to-one correspondence with each of the bearing surfaces and matched in parallel, and the support frame is located between each side surface of the rotating shaft and the bearing surface aligned and matched with the side surface.

8. The lithium battery production equipment according to claim 5, wherein the pressing assembly comprises a base fixed on the bearing surface, an upper part of the base is provided with a connecting rod in a direction parallel to the axis of the prism, one end of the connecting rod close to the middle of the prism is provided with a pressing handle for contacting and matching with the battery strip, a first swing rod and a second swing rod arranged in sequence along an axial direction of the prism are respectively provided between the connecting rod and the base; the adjacent ends among the base, the first swing rod, the connecting rod, and the second swing rod are hinged in sequence to form a four-bar linkage mechanism, an extension direction of each of hinge shafts is parallel to the bearing surface where the base is located and perpendicular to the axis of the prism, and the base is also provided with a pressing motor for driving a linkage movement of the four-bar linkage mechanism.

9. The lithium battery production equipment according to claim 8, wherein a guide post penetrates through an end of the connecting rod along a direction perpendicular to the bearing surface where the base is located, the pressing handle is connected to the bottom of the guide post, and the guide post is sleeved with a second spring embedded between the bottom surface of the end of the connecting rod and the top surface of the pressing handle, and the bottom of the pressing handle is provided with a flexible gasket for contacting and matching with the battery strip.

10. The lithium battery production equipment according to claim 5, wherein the cutting assembly comprises a cutting head and a first position control system, the cutting head is any one of a laser cutting head, a knife with a cutting edge, or a high-temperature knife with a heating function, and the first position control system is a slider moving mechanism consisting of a slider controllably moving on a guide rail or a multi-axis mechanical arm.

11. The lithium battery production equipment according to claim 5, wherein the reclaiming assembly comprises a gripping head and a second position control system, the gripping head is a clamping plate driven by a finger driving member, and the second position control system is a slider moving mechanism consisting of a slider controllably moving on a guide rail or a multi-axis mechanical arm.

12. The lithium battery production equipment according to claim 11, wherein the finger driving member is a finger air cylinder or a finger motor.

* * * * *